G. M. EATON.
ELECTRIC RAILWAY VEHICLE.
APPLICATION FILED DEC. 24, 1909.
990,966.
Patented May 2, 1911.
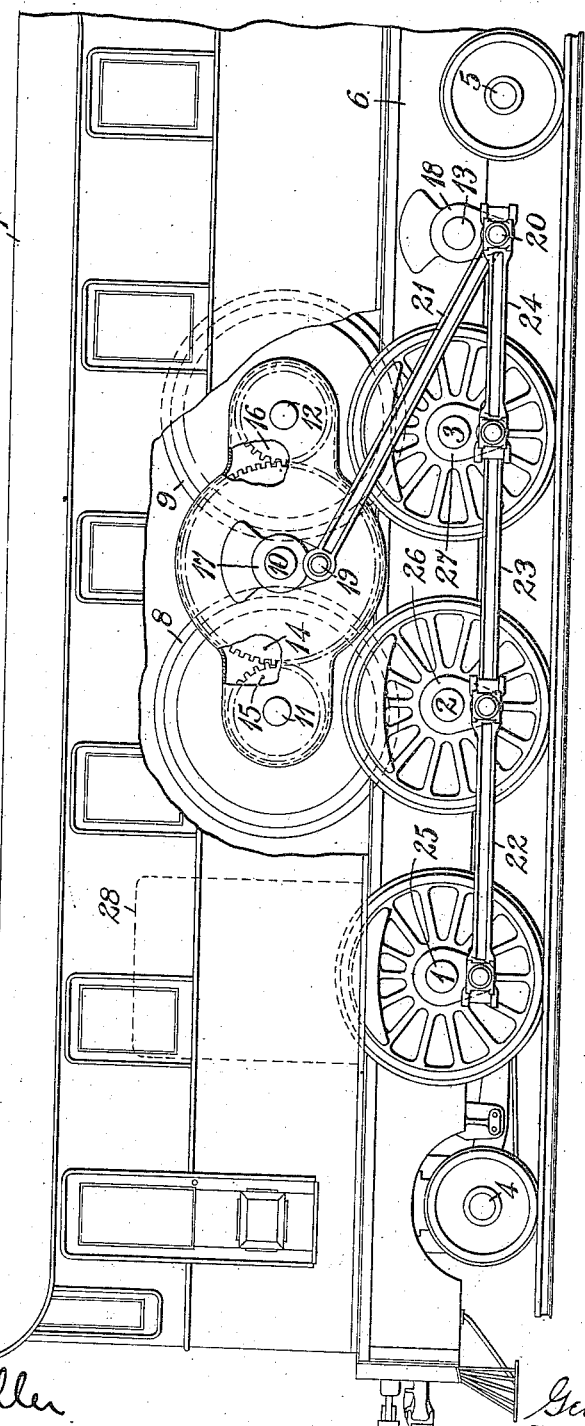
WITNESSES:
Fred H. Miller
R. J. Dearborn
INVENTOR
George M. Eaton
BY
Wesley S. Carr
ATTORNEY

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRIC RAILWAY-VEHICLE.

990,966. Specification of Letters Patent. Patented May 2, 1911.

Application filed December 24, 1909. Serial No. 534,755.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Railway-Vehicles, of which the following is a specification.

My invention relates to railway vehicles and particularly to such electric locomotives as are adapted for hauling heavy trains and are provided with a small number of motors of large size.

The object of my invention is to provide a driving connection for locomotives of the class indicated above that shall be relatively simple in construction and that shall permit a particularly advantageous distribution of weight upon several driving axles which are arranged relatively close together in order to secure a maximum tractive effort with a short rigid wheel-base.

According to my present invention I provide a jackshaft which is parallel to, and in substantially the same horizontal plane as, the driving wheel-axles of the locomotive and which is located outside of the rigid wheel-base; two relatively large driving motors mounted in the locomotive cab almost directly above two of the driving axles, and a second jackshaft disposed between the two motors and parallel to their axes.

A driving connection is established between the motors and the intermediate jack-shaft by means of gears mounted on the jackshaft and pinions which mesh with the gears and are mounted on the motor shafts. Side rod connections are established between the two jackshafts and between the lower jackshaft and the drivers. The lower jack-shaft is offset relative to the upper one and is materially removed from the nearest driving wheel-axle in order that the usual adjustment between the locomotive frame and the axles may be permitted, the jackshafts being rotatably supported in suitable bearings which are attached to the locomotive frame.

The arrangement outlined above possesses a number of advantages over the driving connections heretofore proposed among which the following are the more important:—

1. By providing a suitable gear ratio between the motors and the intermediate jack-shaft, driving wheels of large size may be employed.

2. Since the two driving motors are operatively connected to a gear wheel which is located between them, the pressures on the bearings of the jackshaft produced by the operation of the gears are substantially neutralized and the only resultant forces acting upon the jackshaft are those which tend to produce rotation.

3. The armature bearings of the motors are relieved from side pressures, which obtain when motors are directly connected to driving rods and which are liable to produce excessive wear in the armature bearings. Considerable wear may be permitted in the jackshaft bearings without serious trouble, but if wear is permitted in the motor shaft bearings, the motor armatures become eccentric relative to the field magnet poles and the operation of the motor may be seriously affected.

4. The armatures of the two motors are connected to each other only by gears, consequently, if one of the motors becomes short-circuited, or other abnormal conditions arise which suddenly lock one of the armatures when the locomotive is operating at a high speed, connecting rods and pins are not depended upon for stopping the other armature, which is very heavy and which, consequently, has a considerable fly-wheel effect. Should conditions of this kind arise in the use of my invention, some of the gear teeth might be sheared off, but damage of this character can be repaired without great difficulty and there is no danger of wrecking the locomotive, as there would be if one of the crank pins should be broken off and one end of a connecting rod come into contact with the roadbed.

5. The motors themselves, which are very heavy, are located directly over the driving wheel-axles.

6. The distances between the gear centers may be properly maintained without difficulty since the three shafts on which the gear wheel and the two pinions are mounted, are parallel to each other and are all rotatably mounted upon the same structure.

The single figure of the accompanying drawing is an elevation, with certain of the parts broken away to disclose the driving connections of an electric locomotive constructed in accordance with my invention.

Referring to the drawing, the structure here shown comprises a plurality of driving wheel-axles 1, 2 and 3 and pony truck-axles 4 and 5 on which the body frame 6 and the locomotive cab 7 are mounted. A pair of electric driving motors 8 and 9 are mounted upon the body frame 6, within the cab 7, their axes being almost directly above the wheel-axles 2 and 3, respectively. A jackshaft 10 is rotatably mounted in suitable bearings between the shafts 11 and 12 of the motors 8 and 9 and is parallel to them.

A jackshaft 13 is rotatably mounted in suitable bearings which are secured to the body of the frame 6, the center line of this jackshaft being in substantially the same horizontal plane as the driving wheel-axles 1, 2 and 3 and parallel to them. The jackshaft 10 is provided with one or more gear wheels 14, which are driven by pinions 15 and 16, secured, respectively, to the motor shafts 11 and 12.

A driving connection is established between the two jackshafts 12 and 13 by cranks 17 and 18 having crank pins 19 and 20 that are joined by connecting rods 21. The jackshaft 13 is, in turn, operatively connected to the driving wheel-axles 1, 2 and 3 by means of side rods 22, 23 and 24 and cranks 25, 26 and 27.

It is evident that the number of drivers employed may be increased or decreased, as desired, the three driving wheel-axles shown being particularly well adapted for alternating current locomotives having two driving motors and a transformer 28, since these three very heavy parts may be respectively carried over the driving axles and a substantially uniform distribution of weight be thereby effected.

It will of course be understood that the two sides of the locomotive may be either similarly equipped or the driving gears may be omitted from one end of the shafts 10, 11 and 12. If one pinion is provided for each motor, it may be found desirable to use two gear wheels and to locate the pinions at opposite ends of the motor shafts. Since the driving motors are located within the cab of the locomotive, the center of gravity of the locomotive is much higher than it otherwise would be, which is a decided advantage since the side thrust against the track during the operation of the locomotive is minimized, the cab being resiliently supported from the trucks in the usual manner. The cranks at opposite sides of the locomotive preferably bear a quadrature relation to each other in order that the vehicle may be started from any position of rest.

I desire that variations in size and arrangement of parts, which do not depart from the spirit of my invention, shall be included within its scope.

I claim as my invention:

1. In an electric vehicle, the combination with a body frame, a plurality of driving wheel-axles constituting a rigid wheel-base, a jackshaft secured to the frame parallel to the driving wheel-axles and outside the rigid wheel-base of the locomotive, of a pair of driving motors mounted on a frame above the driving wheel-axles, a jackshaft between the motors, a gearing connection between the motors and the intermediate jackshaft, and a driving connection between the two jackshafts and between the driving wheel-axles and one of the jackshafts.

2. In an electric vehicle, the combination with a body frame, a cab supported thereon, a plurality of driving wheel-axles constituting a rigid wheel-base, a jackshaft rotatably supported by the body frame parallel to and in the same horizontal plane as the driving axles, of driving motors secured to the frame and located within the cab, a jackshaft located between the two motors and geared to them, and a side rod connection from the intermediate jackshaft through the other jackshaft to the driving wheel-axles.

3. In an electric vehicle, the combination with a body frame, a truck having two or more axles and wheels, and a jackshaft mounted on the frame at one end of the truck, of two motors mounted on the frame above two of the axles; a second jackshaft disposed between the motors and geared to both, and rod connections between the two jackshafts and between the first-named jackshaft and the truck-axle.

4. In an electric vehicle, the combination with a body frame, a truck having two or more axles and wheels, and a jackshaft, of two motors mounted on the frame, a second jackshaft disposed between the motors and geared to both, and rod connections between the two jackshafts and between the first-named jackshaft and the truck-axle.

In testimony whereof, I have hereunto subscribed my name this 10th day of December, 1909.

GEORGE M. EATON.

Witnesses:
G. W. BORAT,
B. B. HINES.

Copies of this patent may be obtained for five cents each, by addressing the "Commissioner of Patents, Washington, D. C."